March 19, 1940. A. WEISENBURG ET AL 2,193,955
MACHINE FOR SOLDERING LITHOGRAPHED CANS ON THE INSIDE
Filed March 9, 1939
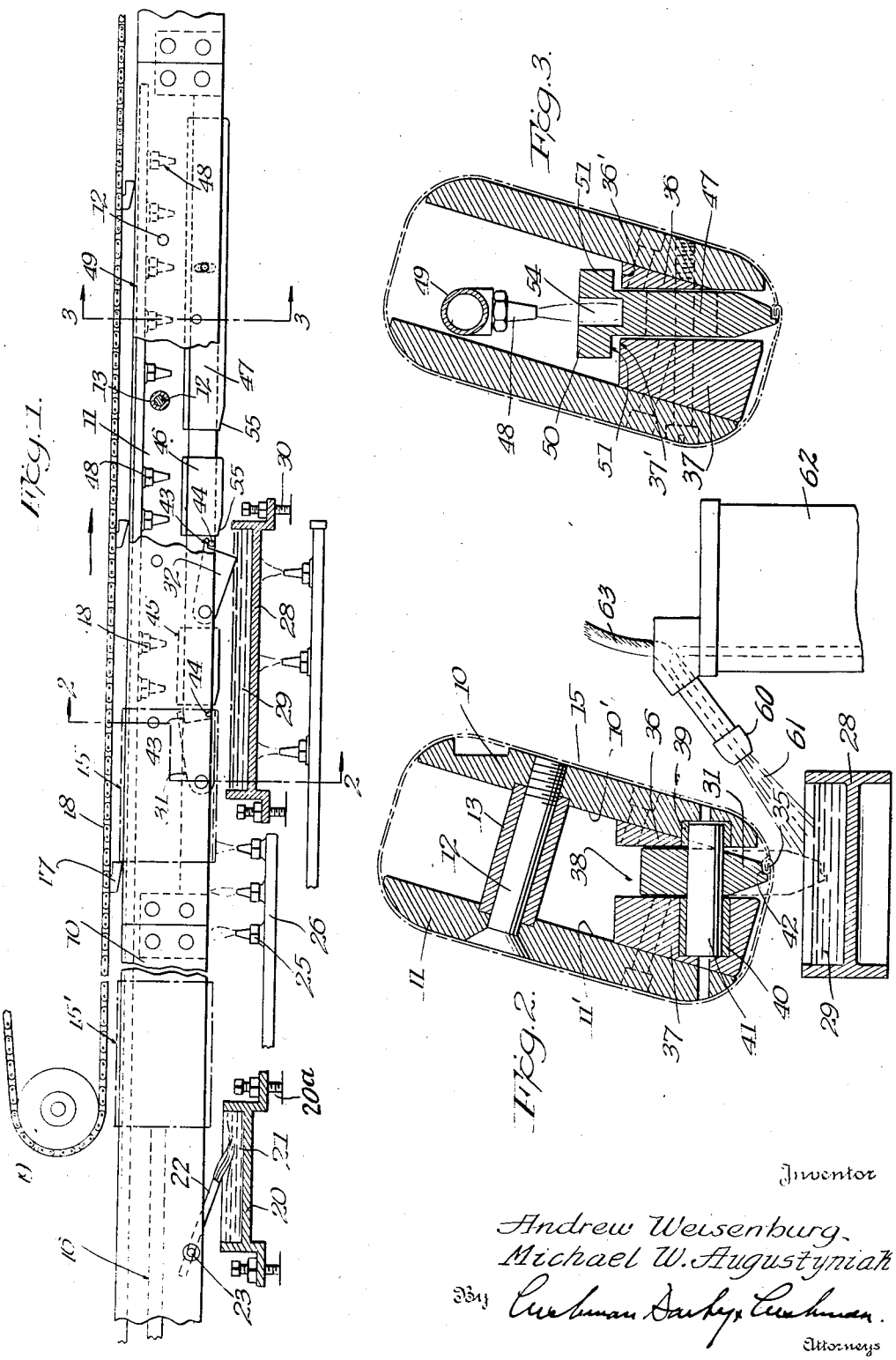

Patented Mar. 19, 1940

2,193,955

UNITED STATES PATENT OFFICE 2,193,955

MACHINE FOR SOLDERING LITHOGRAPHED CANS ON THE INSIDE

Andrew Weisenburg and Michael W. Augustyniak, Philadelphia, Pa., assignors to Crown Can Company, Philadelphia, Pa., a corporation of Pennsylvania Application March 9, 1939, Serial No. 260,868

19 Claims. (Cl. 113—111)

The present invention relates to an apparatus for applying solder to the inside of the side seams of can bodies.

In accordance with conventional practice, can body forming blanks are lithographed or otherwise decorated before they are formed into cylindrical or other shapes. If the side seams are soldered, in accordance with standard practice by applying solder to the outside of the formed bodies, it is necessary that a narrow strip along the line where the side seam is to be formed, be left blank or uncoated during the lithographing or decorating operation on the blank. This is necessary because the solder will not properly adhere to painted, lithographed or otherwise coated tin plate. This bare, uncoated strip is objectionable because it is unsightly and because it detracts from the decorative effect of the matter lithographed or printed on the can body.

It is an object of the invention to provide improved means for applying solder to the inside of the side seam, instead of to the outside thereof, to the end that the entire exterior surface of the body forming blank may be decorated, thereby leaving no uncoated strip along the seam.

It it a further object of the invention to provide improved and simplified means for accurately and adjustably determining the amount of solder to be applied to the inside of the side seams.

It is a further object of the invention to provide improved, simplified and novel means for maintaining the solder applied to the side seam, and the seam itself, at a sufficiently high temperature for a sufficiently long period of time to enable the solder to fill completely the spaces between the folds of metal in the seam. It is known to those skilled in the art that the solder fills the side seam of a can body by flowing into the small spaces therein by capillary attraction. The present invention aims to provide improved and simplified means for maintaining the solder in fluid state for a sufficiently long period of time to cause this capillary attraction to have maximum effectiveness.

It is a further object of the invention to provide, in combination with the improved solder applying and sweating means, simple, efficient and novel means for applying flux to the inside of the side seam.

The invention consists in the novel combination of parts, structural features, and specific details disclosed in the accompanying drawing and described below.

In the drawing:

Figure 1 is a side elevation, partly in section, with certain parts broken away, showing a solder applying apparatus in accordance with the invention.

Figure 2 is a vertical section substantially on line 2—2 of Figure 1, and

Figure 3 is a vertical section on line 3—3 of Figure 1.

In the drawing, the invention is shown as applied to the can soldering horn of a standard "Bliss" can body forming machine. The means for feeding the blanks, for wrapping them around the horn and for forming the side seams are not shown herein, as those devices constitute no part of the present invention.

The horn is shown as made up of a pair of side plates 10, 11, held in spaced relation by bolts 12, and spacer sleeves 13, or the like. The can body blanks 15, in spaced relation, are fed along the horn from the forming station by reciprocating pusher bars 16 or the like, which are normally associated with body forming machines of this type. At the position of the can body blank 15', the reciprocating movement of the blanks, under the influence of the pusher bars 16, terminates, and, instead, the blanks are moved continuously along the horn by blocks 17 carried by a continuously moving chain 18, trained about a sprocket 19. The chain 18 serves to move the bodies along the horn at a definite, constant speed, until they are discharged at the rear end of the horn.

Beneath the horn, at substantially the end of the stroke of the reciprocating pusher bars 16, there is disposed a pot 20 adapted to contain a body of fluid flux 21. A brush 22 is pivoted at 23 within the horn, between the side plates 10 and 11. The brush drops into the flux pot by gravity, in the spaces between the can bodies. Means are provided for limiting the extent of downward swing of the brush, and the pot is vertically adjustable by vertically disposed threaded screws 20a, or the like, to control the degree of immersion of the brush in the flux, and thereby to control the amount of flux applied to each seam.

At a point spaced shortly behind the flux pot, a plurality of gas burners 25 are positioned to direct a plurality of gas flames upwardly toward the horn, to play upon the side seams of the can bodies as they move along the horn. In practice, it has been found that a plurality of such burners positioned to provide a heating zone substantially twenty-four inches in length, will raise the metal of the can bodies to the proper temperature. Gas or other fuel may be supplied to the burners by a pipe 26, which may also serve as a support for the burners.

Immediately behind the pre-heating burners 25, there is positioned a normally stationary, vertically adjustable solder pot 28, having a body of moulten solder 29 therein, maintained at a constant, predetermined level in the pot by any well known means. The vertical position of the pot may be adjusted by any appropriate means, such as threaded screws 30, or the like.

The horn, above the pot, is provided with means for taking solder from the pot and applying it to the inside of the side seams of the can bodies. Preferably, this means comprises a pair of soldering irons 31, 32, pivotally supported by the plates 10, 11 as shown in Figure 2. As indicated in Figure 2, the side plates 10, 11 are disposed on parallel planes inclined with respect to a vertical plane. This is, in many cases, desirable in order that the side seam 35 may be disposed as close as possible to the solder pot, and on the lowermost longitudinal line in the circumference of the horn. The inner faces 10', 11' of the plates 10, 11 carry blocks 36, 37, providing, between their inner faces, a vertical slot 38. It will be noted that the inner faces of the blocks 36, 37 are disposed on vertical planes, whereas the outer faces thereof are angularly disposed with respect thereto, on planes parallel to the planes of the plates 10, 11.

The blocks 36, 37 and at least one side plate of the horn are provided with bores in which bushings 39, 40 are disposed. A transverse pin 41, carrying the pivoted soldering iron 31, is journalled therein, thereby permitting free swinging movement of the soldering irons under the influence of the can bodies.

As indicated in Figure 2, the lower face of each soldering iron is cut away or rabbeted, as at 42, so as to provide surfaces positioned to contact with the inner face and a side face of the seam 35, to facilitate the application of solder thereto. Moreover, each soldering iron has a rearwardly projecting tail piece 43 (Fig. 1) adapted to engage a transverse abutment pin 44, to limit its downward swinging movement with respect to the solder pot.

Between the two soldering irons 31, 32, there is disposed a freely floating, vertically movable sweating iron 45. A similar iron 46 is disposed immediately behind the last soldering iron 32. Also, one or more elongated sweating irons 47 are positioned behind the last-mentioned sweating iron. The sweating irons are preferably all positively heated by burners 48, supplied with gas fuel and supported by a pipe 49, or the like.

As shown in Figure 3, the sweating irons, such as the one indicated at 47, are all supported by continuations of the blocks 36, 37, or by similarly disposed blocks. The sweating irons are preferably in the form of T-section bars having heads 50 including laterally projecting shoulders 51 disposed above the upper surfaces 36', 37', respectively, of the blocks 36, 37. Thus, downward movement of the sweating irons is definitely limited. Longitudinal movement of the sweating irons may be restrained by any appropriate means, such as a pin and slot connection, or any other abutment, so long as free vertical movement of the irons is permitted.

The head 50 of each sweating iron preferably is provided with a longitudinal groove or an equivalent aperture or recess 54 in its upper surface to receive the flame issuing from the burners 48, to facilitate maintaining the irons at a proper, elevated temperature.

The forward end of the lower face of each sweating iron is preferably beveled or inclined upwardly as shown at 55, Figure 1, to cause the irons to ride upwardly above the side seams upon engagement of the irons with the can bodies.

The number of solder applying irons 31, 32 may be varied at will, depending upon the length of the side seams of the can bodies and the amount of solder to be applied thereto. In the present embodiment of the invention, two solder applying irons are shown, but it must be understood that a greater or lesser number may be used.

The vertical adjustment of the solder pot 28 is of considerable importance, since, by this means, the amount of solder applied by each iron to the side seam may be varied at will. If the pot is raised, so that the irons dip into the solder to a greater depth, more solder will be picked up by the irons and applied to the side seam, and vice versa.

The apparatus of the invention includes novel means for maintaining the soldering irons free of excess solder and for preventing the accumulation of solder on the sides and bottom faces of the irons. As shown in Figure 2, a spray nozzle 60 is positioned adjacent the pot 28 and directed downwardly and inwardly, to project an extremely fine spray 61 of liquid flux toward the surface of the solder and toward the soldering iron when the latter is in its lowered position. A container 62 supplies the liquid flux to the nozzle, and the spray is projected toward the soldering iron by a compressed air line 63.

As a result of the operation of this flux spray, the faces of the soldering iron are maintained in a moist condition, covered with a thin film of flux, thereby preventing the solder from adhering to, and accumulating upon the irons. In some cases, it will be found desirable to use a plurality of sprays with each soldering iron, particularly if the irons are of considerably greater length than the ones disclosed. Moreover, spray devices similar to the one represented diagrammatically in Figure 2 may be used on both sides of each solder applying iron. The flux spray does not interfere with the function of the iron in picking up the molten solder and applying the same to the inside of the side seams. It simply prevents the accumulation of excess solder on the iron. In practice, the spray has been found to enable the irons to operate continuously for an entire day's run, without the necessity for cleaning the irons or otherwise removing excess solder or scum.

In the operation of the apparatus of the present invention, the can bodies are moved past the flux applying brush by the reciprocating pushers 16. During that movement, the brush is raised by contact with the leading end of each body, and flux is applied to the inside of the side seams 35 by a wiping action of the brush therealong. Shortly after the bodies have passed the flux applying means, they are picked up by the continuously moving chain 18 and are advanced along the horn by the lugs 17, in proper, predetermined spaced relation. The can bodies first encounter the gas burners 25, which direct a plurality of flames toward and along the outside of the side seams, to raise the metal to a predetermined, soldering temperature. Next, the leading ends of the bodies encounter the soldering iron 31 which has previously dropped down through the flux spray 61, and dipped into the solder 29 in the pot 28, to the desired depth, depending upon the vertical adjustment of the pot. As the bodies move along, they serve to raise the soldering iron 31, which carries with it, a predetermined, desired amount of solder. The lower face of the soldering iron wipes this solder along the side seam. Substantially all of the solder is deposited upon the seam and little or none retained by the iron, since the flux spray 61 has conditioned the iron to prevent the accumulation of solder thereon. Capillary attraction draws the solder into the small spaces between the folds of the side seam, and this action is facilitated by the first sweating iron 45, which is raised by the leading end of each can body. The iron 45 is maintained in heated relation and, in turn, keeps the side seam and the solder at the proper elevated temperature, to enable all of the solder applied by the first iron to be drawn into the joint.

The side seams then receive another quantity of solder by application from the second soldering iron 32. This iron is raised in the same manner as the first iron and, again, a predetermined amount of solder is applied to the seam.

The heated sweating irons 46 and 47 exert a wiping action on the previously deposited solder and maintain the metal of the seam and the molten solder at a proper temperature to complete the soldering action. That is, they maintain the parts in such condition that the capillary attraction is effective for a sufficient period of time to enable the solder to fill all of the spaces between the folds of metal in the side seam, thus assuring that a perfect joint is made.

The combination of pivoted soldering irons and freely floating, vertically movable sweating irons has been found to be particularly effective in performing a soldering operation on the inside of the side seams of can bodies. The pivoted irons deposit an exactly predetermined, adjustable amount of solder upon the seams and distribute the same therealong. The vertically movable, floating sweating irons apply a constant, predetermined amount of heat and pressure to the side seam, so that the action of the capillary attraction can be accurately controlled. The elongated sweating iron 47 is particularly effective, since it applies heat and pressure simultaneously to the entire length of each side seam. This arrangement of parts has been found effective in applying the exact amount of heat desired, so that a perfect joint may be formed, without burning or scorching the lacquer or other coating applied as a decoration to the outside of the can body.

It must be understood that the present invention is not limited to the precise details of construction and combination of parts shown in the accompanying drawing and described above, but covers all arrangements of parts coming within the scope of the appended claims, and their equivalents.

We claim:

1. Apparatus for soldering the side seams of can bodies, comprising a horn along which the can bodies are moved in spaced relation, with their side seams disposed downwardly, a vertically adjustable, normally stationary solder pot below the horn, a soldering iron pivotally supported within the horn above said pot and mounted to swing downwardly and to dip into the solder therein between the spaced can bodies moving along the horn, said iron having its lower surface inclined from the pivoted end downwardly in the direction of movement of the can bodies and facing the leading edge thereof when in the lower position, said surface being positioned to be engaged by a can body to swing the iron upwardly and to deposit and wipe solder upon the inside of the side seam during the movement of the can body.

2. Apparatus for soldering the side seams of can bodies, comprising a horn along which the can bodies are moved in spaced relation with their side seams disposed downwardly, said horn having a slot in its lower face opposite said side seams, a vertically adjustable, normally stationary solder pot below the horn, a pair of spaced soldering irons pivotally supported within the horn above the solder pot, said irons being mounted to swing downwardly through said slot and to dip their lower free ends into the solder therein in the spaces between the can bodies moving along the horn, said irons each having a face inclined downwardly and forwardly from the pivoted end and positioned to be engaged by the leading edge of the can bodies to be swung upwardly into the horn above the side seam, thereby to deposit solder upon the inside of the side seams of the bodies as they move along the horn.

3. Apparatus for soldering the side seams of can bodies, comprising a horn along which the can bodies are moved in spaced relation, said horn having a slot in its lower face opposite the side seams of the can bodies, a vertically adjustable, normally stationary solder pot below the horn, a pair of spaced soldering irons pivotally supported within the horn above the solder pot, said irons being mounted to swing downwardly through said slot and to dip their lower, free ends into the solder therein in the spaces between the can bodies moving along the horn, a vertically movable, freely floating elongated sweating iron mounted between the soldering irons and having a lower end projecting through the slot to engage the side seam of the body but clear of the solder in said pot, said soldering irons each having a face inclined downwardly from their pivoted ends and positioned to be engaged by the leading edge of the can bodies to be swung upwardly into the horn above the side seam, thereby to deposit solder upon the inside of the side seams of the bodies as they move along the horn.

4. Apparatus for soldering the side seams of can bodies, comprising a horn along which the can bodies are moved in spaced relation with their side seams adjacent the lower face thereof, said lower face having a slot opposite said side seams, means for pre-heating the side seams of the can bodies, a vertically adjustable, normally stationary solder pot below the horn, a pair of soldering irons pivotally suported within the horn above said pot and mounted to swing downwardly through said slot and to dip into the solder in the pot, said irons being positioned to be engaged by the moving can bodies and to be swung upwardly to deposit solder along the inside of the side seams, and an elongated, freely floating, sweating iron disposed behind the soldering irons, to heat and to wipe the solder applied by the soldering irons into the side seams, said sweating iron being at least as long as each of said can bodies moving along the horn.

5. Apparatus for soldering the side seams of can bodies, comprising a horn along which the bodies move in spaced relation with their side seams adjacent the bottom thereof, a solder pot below the horn, a soldering iron pivoted at one of its ends within the horn and having its free end positioned to swing downwardly below the horn into the pot in the spaces between the bodies, said iron when in the downwardly swinging position being disposed in and having a face inclined with respect to the path of movement of the side seams and being swingable upwardly into the interior of the moving bodies by contact with the side seams thereof, to cause the free end to apply solder to said side seams.

6. Apparatus for soldering the side seams of can bodies, comprising a horn along which the bodies move in spaced relation with their side seams disposed downwardly, a solder pot below the horn, a transverse pin in the horn, a soldering iron pivoted at one end on said pin and having its free end swingable downwardly below the horn into said solder pot, means for limiting the downward swing of the iron, said iron having a face above the free end inclined downwardly and forwardly from the pivoted end in the path of movement of the side seams of the bodies, the iron being swingable upwardly into the interior of the moving bodies by contact of the leading ends of the can bodies with said surface, to cause the free end of the iron to apply solder to the interior of the side seams of the bodies.

7. Apparatus for soldering the side seams of can bodies, comprising a horn along which the bodies move in spaced relation from a forming station to soldering and sweating positions, means below the horn for directing a flame upon the side seam of the moving bodies to preheat the same, a solder pot below the horn and behind said preheating means, a pair of pivotally mounted soldering irons in the horn adapted normally to dip into the solder in the pot, said continuously moving can bodies serving to swing the soldering irons upwardly and to apply solder to the insides of the side seams, and a plurality of positively heated sweating irons spaced behind the soldering irons, said sweating irons being mounted for free floating movement within the horn with their lower ends in contact with the side seams.

8. Apparatus for soldering the side seams of can bodies, comprising a horn along which the bodies are moved in spaced relation with their side seams disposed downwardly, a vertically adjustable, normally stationary solder pot below the horn, a pair of soldering irons pivoted within the horn above the pot and mounted to be swung upwardly by the can bodies from a lower position dipping into the solder in the pot to an upper position in contact with the inside of the side seam to apply solder thereto, a freely floating sweating iron disposed within the horn between said soldering irons with its lower face positioned to engage the inside of the side seam, and means for directing a flame upon said sweating iron to transfer heat to the side seam and the solder applied thereto.

9. Apparatus for soldering the side seams of can bodies, comprising a horn along which the can bodies are moved in spaced relation with their side seams disposed downwardly, a vertically adjustable, normally stationary solder pot below the horn, a pair of spaced apart soldering irons pivoted within said horn, a pair of freely floating sweating irons spaced alternately with respect to the soldering irons in the horn, said soldering irons being mounted to swing downwardly by gravity to dip into the solder in the pot and to be swung upwardly by the can bodies moving on the horn, to apply solder to the inside of the side seams thereof, and means for directing a heating flame against each of said sweating irons, to transfer heat to the side seams.

10. Apparatus for soldering the side seams of can bodies, comprising a horn along which the can bodies are moved in spaced relation with their side seams disposed downwardly, a vertically adjustable, normally stationary solder pot below the horn, a pair of spaced apart soldering irons pivoted within said horn, a pair of freely floating sweating irons spaced alternately with respect to the soldering irons in the horn, said soldering irons being mounted to swing downwardly by gravity to dip into the solder in the pot and to be swung upwardly by the can bodies moving on the horn, to apply solder to the inside of the side seams thereof, means for directing a heating flame against each of said sweating irons, to transfer heat to the side seams, and an elongated, freely floating sweating iron mounted for vertical movement in the horn behind the aforementioned irons and adapted to engage simultaneously the entire length of the side seam of a can body, and means for directing a flame against said iron to heat the same.

11. Apparatus for soldering the side seams of can bodies, comprising a horn along which the can bodies are moved in spaced relation with their side seams disposed downwardly, a vertically adjustable, normally stationary solder pot below the horn, and means for applying solder from the pot to the inside of the side seams of the cans as they move along the horn over the pot, said means comprising a soldering iron within the horn and means for mounting the same, the last-mentioned means comprising a pair of spaced blocks within the horn having vertically disposed inner faces, and a horizontally disposed pin carried by the blocks and supporting the soldering iron for pivoting movement about the axis thereof, whereby the free end of the iron may dip into the solder pot to collect solder and may be swung upwardly to apply the solder to the side seams of the can bodies moving along the horn by contact therewith.

12. Apparatus for soldering the side seams of can bodies, comprising a substantially hollow horn along which the can bodies are moved in spaced relation with their side seams disposed downwardly, a vertically adjustable, normally stationary solder pot below the horn, and means for applying solder from the pot to the inside of the side seams of the cans as they move along the horn over the pot, said means comprising a pair of blocks having their outer faces juxtaposed to the inner faces of the horn and their inner faces disposed in spaced vertical planes, a horizontally disposed pin spanning the space between the blocks, and a soldering iron pivotally mounted thereon for swinging movement about the axis thereof, said iron having its lower face inclined from the pivoted end downwardly toward its free end, said free end being positioned to dip into the solder in said pot, said surface being positioned to be engaged by a can body to swing the iron upwardly and to deposit and wipe solder upon the inside of the side seam during movement of the cam body.

13. Apparatus for soldering the side seams of can bodies, comprising a horn along which the can bodies are moved in spaced relation with their side seams disposed downwardly, a vertically adjustable, normally stationary solder pot below the horn, said horn comprising a pair of elongated side plates disposed on parallel planes, inclined with respect to the vertical, and means for applying solder from the pot to the side seams, said means comprising a soldering iron pivotally mounted within the horn and supported by said plates for swinging movement in a vertical plane about a horizontal axis, the free end of the iron being positioned to dip into the solder in the pot and to be swung upwardly by the can bodies moving along the horn to deposit solder on the inside of said side seams.

14. Apparatus for soldering the side seams of can bodies, comprising a horn along which the can bodies are moved in spaced relation with their side seams disposed downwardly, a vertically adjustable, normally stationary solder pot below the horn, said horn comprising a pair of elongated side plates disposed on parallel planes inclined with respect to the vertical, and means for applying and sweating solder into the side seams of the can bodies, said means comprising a soldering iron pivoted within the horn for swinging movement in a vertical plane about a horizontal axis, and constructed and arranged to take solder from said pot and apply the same to the inside of the side seam, a freely floating, vertically movable sweating iron disposed behind the soldering iron, and means for heating the sweating iron.

15. Apparatus for soldering the side seams of can bodies, comprising a horn along which the can bodies are moved in spaced relation with their side seams disposed downwardly, a vertically adjustable, normally stationary solder pot below the horn, said horn comprising a pair of elongated side plates disposed on parallel planes inclined with respect to the vertical, a pair of elongated blocks within said horn, each block having an outer face juxtaposed to the inner face of one of said plates, and an inner face disposed in a vertical plane and angularly disposed with respect to its outer face, said blocks having substantially horizontal upper surfaces spaced below the upper end of the horn, a soldering iron pivoted between the blocks for swinging movement in a vertical plane, and a freely floating sweating iron disposed between the blocks behind the soldering iron, said sweating iron having a head including laterally projecting shoulders adapted to seat upon the horizontal upper surfaces of the blocks.

16. Apparatus for soldering the side seams of can bodies, comprising a horn along which the can bodies are moved in spaced relation with their side seams disposed downwardly, a vertically adjustable, normally stationary solder pot below the horn, said horn comprising a pair of elongated side plates disposed on parallel planes inclined with respect to the vertical, a pair of elongated blocks within said horn, each block having an outer face juxtaposed to the inner face of one of said plates, and an inner face disposed in a vertical plane and angularly disposed with respect to its outer face, said blocks having substantially horizontal upper surfaces spaced below the upper end of the horn, a soldering iron pivoted between the blocks for swinging movement in a vertical plane, a freely floating sweating iron disposed between the blocks behind the soldering iron, said sweating iron comprising an elongated T-section bar having a recess in its upper face and positioned with its head overlying the upper surfaces of said blocks, and means for heating the sweating iron, comprising means for projecting a gas flame toward and into said recess therein.

17. Apparatus for soldering the side seams of can bodies on the inside, comprising a horn along which the can bodies are moved in spaced relation, with their side seams disposed downwardly, a normally stationary solder pot below the horn, a soldering iron pivotally supported within the horn above said pot and mounted to swing downwardly and to dip into the solder therein between the spaced can bodies moving along the horn and to be swung upwardly by can bodies to deposit solder on the inside of the side seams, and means for maintaining the surfaces of the iron free of excess solder, to prevent accumulation of solder thereon.

18. Apparatus for soldering the side seams of can bodies on the inside, comprising a horn along which the can bodies are moved in spaced relation, with their side seams disposed downwardly, a normally stationary solder pot below the horn, a soldering iron pivotally supported within the horn above said pot and mounted to swing downwardly and to dip into the solder therein between the spaced can bodies moving along the horn and to be swung upwardly by can bodies to deposit solder on the inside of the side seams, and means for applying a thin coating of flux to said iron to prevent the accumulation of excess quantities of solder thereon.

19. Apparatus for soldering the side seams of can bodies on the inside, comprising a horn along which the can bodies are moved in spaced relation, with their side seams disposed downwardly, a normally stationary solder pot below the horn, a soldering iron pivotally supported within the horn above said pot and mounted to swing downwardly and to dip into the solder therein between the spaced can bodies moving along the horn and to be swung upwardly by can bodies to deposit solder on the inside of the side seams, and means for directing a fine spray of liquid flux toward the surface of the solder in the pot, substantially at the point where the iron dips thereinto, whereby the iron is moistened with flux to prevent the accumulation of excess quantities of solder thereon.

ANDREW WEISENBURG.
MICHAEL W. AUGUSTYNIAK.